United States Patent
Devenyi

(10) Patent No.: US 6,931,960 B1
(45) Date of Patent: Aug. 23, 2005

(54) LEADSCREW MECHANICAL DRIVE WITH DIFFERENTIAL LEADSCREW FOLLOWER STRUCTURE

(75) Inventor: Gabor Devenyi, Penetang (CA)

(73) Assignee: Raytheon Company, Waltham, MA (US)

( * ) Notice: Subject to any disclaimer, the term of this patent is extended or adjusted under 35 U.S.C. 154(b) by 115 days.

(21) Appl. No.: 10/271,479

(22) Filed: Oct. 15, 2002

(51) Int. Cl.$^7$ .............................................. F16H 1/18
(52) U.S. Cl. .................... 74/424.94; 74/89.42; 74/441; 74/424.77
(58) Field of Search ............................ 74/89.42, 441, 74/424.77, 424.94, 424.95

(56) References Cited

U.S. PATENT DOCUMENTS

| | | | | |
|---|---|---|---|---|
| 2,482,082 A | * | 9/1949 | Wahlberg | ................. 74/424.94 |
| 3,614,900 A | * | 10/1971 | Wehlmark | ................. 74/424.94 |
| 4,794,810 A | * | 1/1989 | Parsons | ................... 74/424.94 |
| 5,533,417 A | | 7/1996 | Devenyi | |
| 5,636,549 A | | 6/1997 | Devenyi | |
| 5,732,597 A | | 3/1998 | Devenyi | |
| 5,857,383 A | | 1/1999 | Devenyi | |

\* cited by examiner

*Primary Examiner*—David M. Fenstermacher
(74) *Attorney, Agent, or Firm*—William C. Schubert; Karl A. Vick

(57) ABSTRACT

A leadscrew mechanical drive includes a leadscrew having a leadscrew axis and a leadscrew thread with a nonzero leadscrew thread pitch. A leadscrew follower structure preferably having two leadscrew followers is engaged to the leadscrew. Each leadscrew follower includes a threaded insert having an insert thread with a nonzero insert thread pitch different from the leadscrew thread pitch. The insert thread is engaged to the leadscrew thread over a circumferential distance of less than one-half turn of the insert thread. Each leadscrew follower further includes a bearing in which the threaded insert is received and which permits the threaded insert to rotate about an insert axis that is inclined to the leadscrew axis by an angle $\theta$ for the first leadscrew follower and $-\theta$ for the second leadscrew follower, and a bearing support in which the bearing is received. A preload structure biases each of the leadscrew followers against the leadscrew.

19 Claims, 1 Drawing Sheet

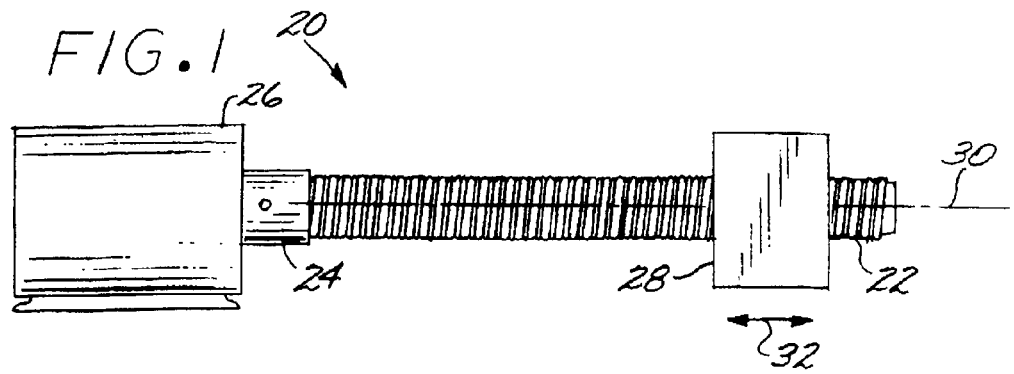
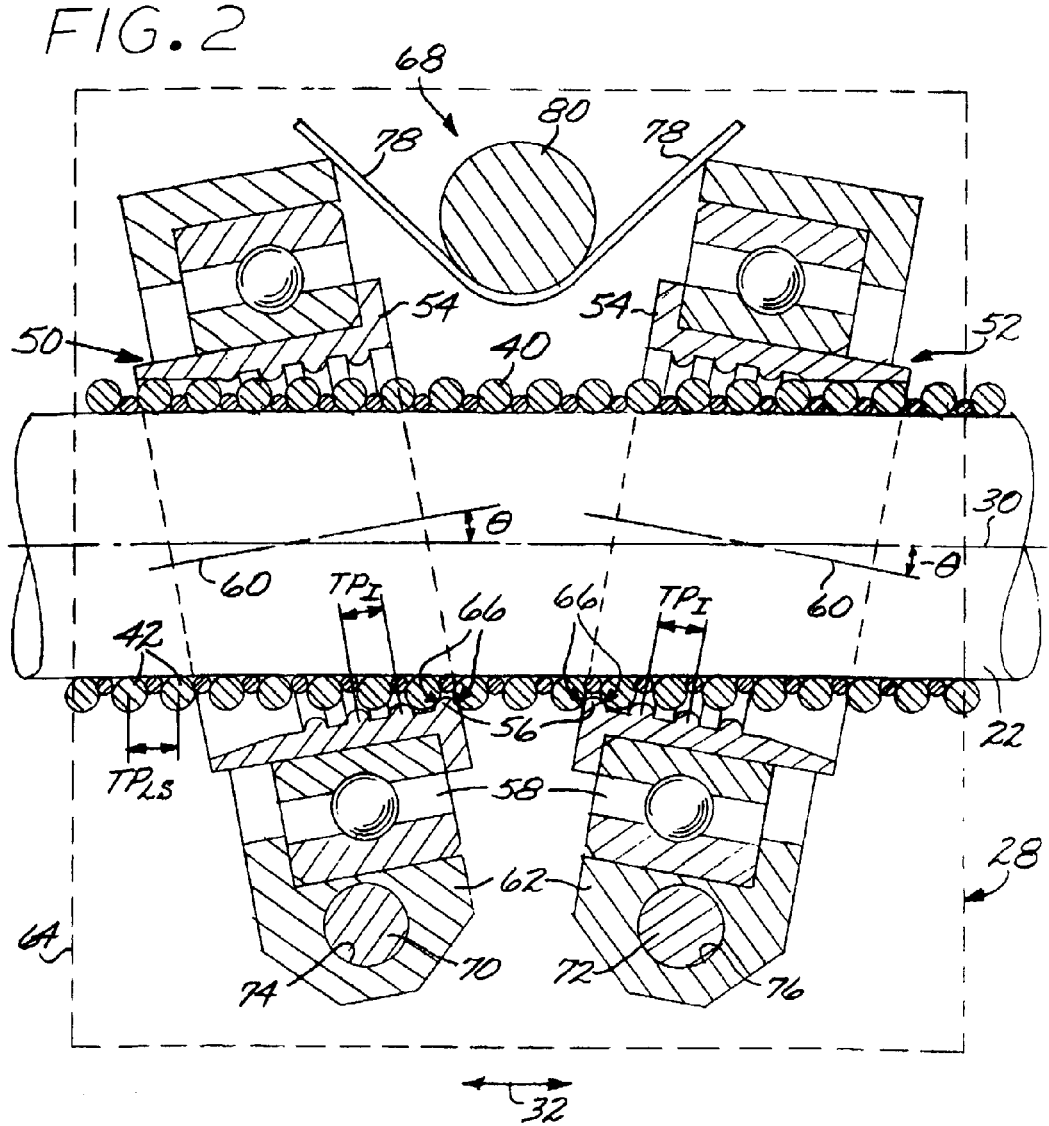

LEADSCREW MECHANICAL DRIVE WITH DIFFERENTIAL LEADSCREW FOLLOWER STRUCTURE

This invention relates to a leadscrew mechanical drive and, more particularly, to a leadscrew mechanical drive utilizing a leadscrew and a leadscrew follower structure.

BACKGROUND OF THE INVENTION

Most common motors have a rotational output, but in many instances the structure to be driven requires a linear motion. There are a number of approaches to mechanically converting the rotational motor output to a linear motion. One such approach is a leadscrew mechanical drive in which the motor rotationally drives a threaded leadscrew. A leadscrew follower structure driven by the leadscrew engages the leadscrew and moves parallel to the axis of the leadscrew to convert the rotational motion to linear motion parallel to the axis of the leadscrew. The leadscrew follower structure typically includes a follower threadably engaged to the leadscrew or a recirculating ball mechanism, although other types of leadscrew followers have been proposed.

The standard leadscrew mechanical drive works well in many situations, but has limitations in others. If the linear motion is to be very slow, the basic leadscrew mechanical drive must be modified. The leadscrew must have a small thread pitch, the leadscrew must be driven through a speed-reducing gearbox placed between the motor and the leadscrew, and/or special motor controls such as a high-resolution rotary optical encoder must be used to measure and control the motor output in a feedback manner. Additionally, care must be taken to minimize play and backlash in the leadscrew mechanical drive. Some of these modifications have physical limitations that limit the ability to achieve the desired slow linear movement. For example, the reduction in thread pitch is limited by the physical width between the turns of the thread that may be achieved by machining or other thread-producing technique. The ability to reduce the rotational output speed of the motor is limited by the structure of the motor windings, so that it may be necessary to use a special low-speed motor. In any event, these modifications lead to an expensive, bulky, and/or heavy leadscrew mechanical drive that may not be suitable for the desired applications.

There is therefore a need for an improved approach to the mechanical conversion of rotary motion to linear motion, particularly for applications in which the required linear motion is very slow. The present invention fulfills this need, and further provides related advantages.

SUMMARY OF THE INVENTION

The present invention provides a leadscrew mechanical drive with a selectable transmission ratio between the rotational rate of the leadscrew and the linear rate of motion of the leadscrew follower structure. The linear motion of the leadscrew follower structure may be selected to be faster or slower than that expected from the normal leadscrew mechanical drive, but the greatest advantage is achieved when the linear motion is slower than that expected from the normal leadscrew mechanical drive. In that instance, the speed reduction is accomplished entirely in the leadscrew/leadscrew follower mechanism. No modification to the motor or motor controller is required, and no separate gearbox is used. The leadscrew mechanical drive is inexpensive, light, and compact. If a controlled-resolution motor such as a stepper motor is used to power the leadscrew mechanical drive, high linear positional resolution and accuracy, coupled with a low movement rate, may be readily achieved. The leadscrew itself may be manufactured with a readily achieved thread pitch, so that no special manufacturing procedures are required for the leadscrew. The present leadscrew mechanical drive is most suitable for relatively light duty applications, where the rate of linear motion is relatively slow and the forces to be transmitted are relatively small.

In accordance with the invention, a leadscrew mechanical drive comprises a leadscrew having a leadscrew axis and a leadscrew thread with a nonzero leadscrew thread pitch, and a leadscrew follower structure engaged to the leadscrew. The leadscrew may be of any type, such as a conventional machined leadscrew or a wire-wound leadscrew. The leadscrew follower structure includes a threaded insert having an insert thread with a nonzero insert thread pitch different from the leadscrew thread pitch. The insert thread is engaged to the leadscrew over a circumferential distance of less than one-half turn (preferably less than about 10 degrees, and most preferably a line contact) of the insert thread. The leadscrew follower structure further includes a bearing in which the threaded insert is received and which permits the threaded insert to rotate about an insert axis that is inclined to the leadscrew axis, and a bearing support in which the bearing is received. Preferably, the insert axis is inclined to the leadscrew axis by an angle that is greater than zero and less than about 45 degrees, and more preferably less than about 32 degrees. There is desirably a preload forcing the insert thread against the leadscrew thread to minimize play in the drive and backlash when the direction of the drive is reversed.

The leadscrew thread pitch may be greater or less than the insert thread pitch, but the greatest advantage is achieved in a speed reducing drive in which the leadscrew thread pitch is greater than the insert thread pitch. The insert thread sense may be the same as or different than the leadscrew thread sense. As used herein, the "thread sense" is either a left-hand or a right-hand thread.

The benefits of the present approach may be achieved using a single leadscrew follower, but a preferred design uses two cooperating leadscrew followers. Thus, a leadscrew mechanical drive comprises a leadscrew having a leadscrew axis and a leadscrew thread with a nonzero leadscrew thread pitch, and a leadscrew follower structure engaged to the leadscrew. The leadscrew follower structure includes a first leadscrew follower and a second leadscrew follower. The first leadscrew follower and the second leadscrew follower are substantially identical in structure. Each leadscrew follower includes a threaded insert having an insert thread with a nonzero insert thread pitch different from the leadscrew thread pitch. The insert thread is engaged to the leadscrew over a circumferential distance of less than one-half turn of the insert thread. The leadscrew follower structure further includes a bearing in which the threaded insert is received and which permits the threaded insert to rotate about an insert axis that is inclined to the leadscrew axis by an inclination angle for the first leadscrew follower and a negative of the inclination angle for the second leadscrew follower. A preload structure biases each of the leadscrew followers against the leadscrew. Compatible features discussed elsewhere herein may be used with this embodiment.

In this preferred form of the leadscrew follower structure, the preload structure comprises a first-leadscrew follower pivot about which the first leadscrew follower pivots, and a second-leadscrew follower pivot about which the second leadscrew follower pivots. The first-leadscrew follower pivot and the second-leadscrew follower pivot are adjacent to each other. A preload such as a spring forces the two leadscrew followers to pivot away from each other about their respective pivots to produce an engaging frictional contact between the threads of the leadscrew and the leadscrew followers.

In a conventional leadscrew mechanical drive where the thread pitch of the leadscrew and the thread pitch of the leadscrew follower structure are the same, the leadscrew follower structure engages the leadscrew over several turns and moves linearly by the amount of the thread pitch with each revolution of the leadscrew. In the present approach where the thread pitches of the leadscrew and the leadscrew follower structure are different, the leadscrew follower structure moves linearly by the difference between the thread pitches with each revolution of the leadscrew, thereby achieving a differential drive effect. A small linear movement rate may be achieved by making the thread pitches of the leadscrew and the leadscrew follower structure close to the same but slightly different. Having a different thread pitch of the leadscrew and the leadscrew follower structure is not possible with conventional leadscrews, because the mismatch would lead to binding between the two threads. In this case, however, binding between the thread of the leadscrew and the thread of the leadscrew follower structure is avoided by inclining the two sets of threads to each other and achieving a contact over a circumferential distance of less than about one-half turn, and preferably a line contact between the two threads over a circumference of less than about 10 degrees.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic representation of a leadscrew mechanical drive; and

FIG. 2 is a schematic detail of the leadscrew and a preferred form of the leadscrew follower structure used in the leadscrew mechanical drive of FIG. 1.

DETAILED DESCRIPTION OF THE INVENTION

FIG. 1 depicts a leadscrew mechanical drive 20. The leadscrew mechanical drive 20 includes an externally threaded leadscrew 22 that is driven by a rotational output 24 of a motor 26 or other power source. A leadscrew follower structure 28 is engaged to the leadscrew 22. As the motor 26 turns the leadscrew 22 about its rotational leadscrew axis 30, the threaded engagement between the leadscrew follower structure 28 and the leadscrew 22 translates the rotational movement of the leadscrew 22 into linear movement of the leadscrew follower structure 28 in a linear movement direction 32 parallel to the rotational leadscrew axis 30. The leadscrew follower structure 28 is attached to the structure (not shown) that is to be moved in the linear manner.

FIG. 2 schematically depicts the leadscrew 22 and the leadscrew follower structure 28 of a preferred embodiment of the present approach in greater detail. The leadscrew 22 comprises a helical leadscrew thread 40 having a series of turns 42 with a thread pitch $TP_{LS}$. The thread pitch of the leadscrew 22 is defined as the linear distance measured parallel to the rotational leadscrew axis 30 between two adjacent turns 42 of the leadscrew thread 40. The thread pitch is nonzero and may be either a lefthand sense or a right-hand sense. The illustrated leadscrew thread 40 is a wire-wound leadscrew of the type disclosed in U.S. Pat. No. 5,636,549, whose disclosure is incorporated by reference. The leadscrew thread 40 may instead be a machined thread or any other operable type.

The leadscrew follower structure 28 is engaged to the leadscrew 22. The leadscrew follower structure 28 includes at least one, and preferably two, leadscrew followers in a cooperating relationship. The present approach is operable with a single leadscrew follower of the type described next, but the force-balanced approach achieved using two leadscrew followers is preferred and will be described.

The leadscrew follower structure 28 includes a first leadscrew follower 50 and a second leadscrew follower 52. The physical structures of the first leadscrew follower 50 and the second leadscrew follower 52 are preferably substantially identical, but the two leadscrew followers 50 and 52 are arranged in a cooperating manner as will be described. Each leadscrew follower 50, 52 includes a threaded insert 54 having an internal insert thread 56 with a nonzero insert thread pitch $TP_1$. An important feature of the present approach is that the insert thread pitch $TP_1$ is different from the leadscrew thread pitch $TP_{LS}$. The present approach of a differential leadscrew follower structure is not operable if the insert thread pitch $TP_1$ is the same as the leadscrew thread pitch $TP_{LS}$. If the two thread pitches $TP_1$ and $TP_{LS}$ were the same, the insert 54 would idle in one position and not advance in either direction.

The amount of linear advance LA of the leadscrew follower structure 28 parallel to the linear movement direction 32, for each revolution of the leadscrew 22 about its rotational leadscrew axis 30, is $LA=(TP_{LS}-TP_1)$. By making $TP_{LS}$ and $TP_1$ close to each other but not the same value, LA may be made small and less than either $TP_{LS}$ or $TP_1$. Thus, for example, if $TP_1$ is 0.529 millimeters (48 threads per inch) and $TP_{LS}$ is 0.567 millimeters, the linear advance LA per revolution of the leadscrew 22 is 0.567–0.529 millimeters, or 0.038 millimeters. If the motor 26 is a stepper motor with a conventional 20 step poles at 18 degree intervals, there are 20 circumferential positions to which the motor may be accurately stepped in each revolution. The linear controllability of the movement of the leadscrew follower structure is therefore 0.038 millimeters/20, or 0.0019 millimeters per step. By comparison, if the standard approach is used wherein the thread pitch of the leadscrew and the leadscrew follower structure are the same at 0.529 millimeters, the linear controllability of the leadscrew mechanical drive is 0.026 millimeters, over 13 times that of the present differential approach.

The insert thread sense may be the same as a leadscrew thread sense, or different from a leadscrew thread sense. The "sense" of the thread is whether it is a left-hand thread or a right-hand thread. The present approach may be used where the leadscrew thread 40 and the insert thread 56 are either both left-hand or both right-hand, or where one is left-hand and the other is right-hand.

Each of the threaded inserts 54 is received in a bearing 58 which permits the threaded insert 54 to rotate about an insert axis 60 that is inclined to the leadscrew axis 30 by an inclination angle θ. The bearing 58 may be of any operable type, and is illustrated as a roller bearing. If there are two leadscrew followers 50 and 52 as in the illustrated embodiment, it is preferred that the inclination angle of the insert axis 60 of the first leadscrew follower 50 is θ, and that the inclination angle of the insert axis 60 of the second leadscrew follower 52 is the negative of the inclination angle for the first leadscrew follower, or −θ. The value of the inclination angle θ, by which the insert axis 60 is inclined to the leadscrew axis 30, is greater than zero and less than about 45 degrees, and more preferably less than about 32 degrees. Inclination angles of greater than about 45 degrees lead to slippage between the two threads 40 and 56 for all thread profiles. Inclination angles of greater than about 32 degrees lead to slippage between the two threads for conventional 30-degree thread profiles. This arrangement facilitates the preloading that is discussed subsequently.

The inclination between the insert axis 60 and the leadscrew axis 30 causes the insert thread 56 to be engaged to the leadscrew thread 40 on a contact 66 extending over a circumferential distance of less than one-half turn of the insert thread 56 and one-half turn of the leadscrew thread 40. More preferably, the contact between the insert thread 56 and the leadscrew thread 40 is a line (or near-line) contact extending a circumferential distance of about 10 degrees or less of the insert thread 56 and the leadscrew thread 40. (Although ideally a line contact extends zero degrees in the circumferential direction, due to some play and deformation of the elements, it may extend a few degrees, but normally less than about 10 degrees, termed herein a "near-line" contact.) By engaging the two threads 56 and 40 over such a short circumferential distance, there is substantially no binding of the two threads 56 and 40 of different pitches. On the other hand, the short contact distance limits the force that may be transmitted through the leadscrew 22 to the leadscrew follower structure 28 to a relatively small value to ensure that the threads are not deformed.

The bearing 58 is received in and supported by a bearing support 62. The bearing support 62 holds the bearing 58 and thence the insert 54 in the desired orientation with the desired inclination angle(s). The bearing support 58 is supported by a follower-structure housing 64.

A preload structure 68 biases each of the leadscrew followers 50 and 52 (or a single leadscrew follower, where used) against the leadscrew 22. That is, the insert thread 56 is forced against the leadscrew thread 40 to minimize slippage between the two threads, to minimize play in the structure, and to minimize backlash when the direction of rotation of the leadscrew 22 is reversed. Any operable preload structure 68 may be used. In a preferred preload structure 68 illustrated in FIG. 2, there is a first-leadscrew follower pivot 70 about which the first leadscrew follower 50 pivots, and a second-leadscrew follower pivot 72 about which the second leadscrew follower 52 pivots. The first-leadscrew follower pivot 70 and the second-leadscrew follower pivot 72 are adjacent to each other. The pivots 70 and 72 may be dowels extending parallel to each other from the follower-structure housing 64 and through respective bores 74 and 76 in the respective bearing supports 62. A preload forces the two leadscrew followers 50 and 52 to pivot away from each other about their respective pivots 70 and 72. The preload is conveniently produced by a preload spring 78 that is supported upon and reacts against a support pin 80 that extends from the follower-structure housing 64 parallel to the pivots 70 and 72, but at the opposite end of the bearing supports 62. The ends of the preload spring 78 react against the ends of the bearing supports 62 opposite from the respective pivots 70 and 72 to bias the bearing supports 62 outwardly away from the spring support pin 80. This preloading of the bearing supports 62 and thence the inserts 54 creates a secure, play-free, backlash-free contact between the leadscrew thread 40 and the insert thread 56.

The present invention as illustrated in FIGS. 1–2 has been reduced to practice and found to be operable as described herein.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A leadscrew mechanical drive comprising:
    a leadscrew having a leadscrew axis and a leadscrew thread with a nonzero leadscrew thread pitch; and
    a leadscrew follower structure engaged to the leadscrew, the leadscrew follower structure including
        a threaded insert having an insert thread with a nonzero insert thread pitch different from the leadscrew thread pitch, wherein the insert thread is engaged to the leadscrew over a circumferential distance of less than one-half turn of the insert thread,
        a bearing in which the threaded insert is received and which permits the threaded insert to rotate about an insert axis that is inclined to the leadscrew axis, and
        a bearing support in which the bearing is received.

2. The leadscrew mechanical drive of claim 1, wherein the leadscrew tread pitch is greater than the insert thread pitch.

3. The leadscrew mechanical drive of claim 1, wherein the leadscrew thread pitch is less than the insert thread pitch.

4. The leadscrew mechanical drive of claim 1, wherein an insert thread sense is the same as a leadscrew thread sense.

5. The leadscrew mechanical drive of claim 1, wherein an insert thread sense is different from a leadscrew thread sense.

6. The leadscrew mechanical drive of claim 1, wherein the insert axis is inclined to the leadscrew axis by an angle that is greater than zero and less than about 45 degrees.

7. The leadscrew mechanical drive of claim 1, wherein the leadscrew comprises a wire-wound leadscrew.

8. The leadscrew mechanical drive of claim 1, further including
    a preload structure forcing the insert thread against the leadscrew thread.

9. The leadscrew mechanical drive of claim 1, wherein the insert read is engaged to the leadscrew over a circumferential distance of less than about 10 degrees.

10. A leadscrew mechanical drive comprising:
    a leadscrew having a leadscrew axis and a leadscrew thread with a nonzero leadscrew tread pitch;
    a leadscrew follower structure engaged to the leadscrew, wherein the leadscrew follower structure includes a first leadscrew follower and a second leadscrew follower, wherein the first leadscrew follower and the second leadscrew follower are substantially identical, and wherein each leadscrew follower includes:
        a threaded insert having an insert thread with a nonzero insert thread pitch different from the leadscrew thread pitch, wherein the insert thread is engaged to the leadscrew over a circumferential distance of less than one-half turn of the insert thread,
        a bearing in which the threaded insert is received and which permits the threaded insert to rotate about an insert axis that is inclined to the leadscrew axis by an inclination angle for the first leadscrew follower and a negative of the inclination angle for the second leadscrew follower, and a bearing support in which the bearing is receive; and a preload structure that biases each of the leadscrew followers against the leadscrew.

11. The leadscrew mechanical drive of claim 10, wherein the preload structure comprises:

a first-leadscrew follower pivot about which the first leadscrew follower pivots, a second-leadscrew follower pivot about which the second leadscrew follower pivots, wherein the first-leadscrew follower pivot and the second-leadscrew follower pivot and adjacent to each other, and the preload structure that forces the two leadscrew followers to pivot away from each other about their respective pivots.

12. The leadscrew mechanical drive of claim 10, wherein the leadscrew thread pitch is greater than the insert thread pitch.

13. The leadscrew mechanical drive of claim 10, wherein the leadscrew thread pitch is less than the insert thread pitch.

14. The leadscrew mechanical drive of claim 10, wherein the leadscrew comprises a wire-wound leadscrew.

15. The leadscrew mechanical drive of claim 10, wherein the insert thread is engaged to the leadscrew thread over a circumferential distance of less than about 10 degrees.

16. The leadscrew mechanical drive of claim 10, wherein the preload structure comprises a preload spring.

17. A leadscrew mechanical drive comprising:

a wire-wound leadscrew having a leadscrew axis and a leadscrew tread with a nonzero loads crew thread pitch; and a leadscrew follower structure engaged to the leadscrew, the leadscrew follower structure including:

a threaded insert having an insert thread with a nonzero insert thread pitch different from the leadscrew thread pitch, wherein the insert thread is engaged to the leadscrew over a circumferential distance of less than about 10 degrees, a bearing in which the threaded insert is received and which permits the threaded insert to rotate about an insert axis that is inclined to the leadscrew axis, a bearing support in which the bearing is received, and a preload structure forcing the insert thread against the leadscrew thread.

18. The leadscrew mechanical drive of claim 17, wherein the leadscrew thread pitch is greater than the insert thread pitch.

19. The, leadscrew mechanical drive of claim 17, wherein the leadscrew thread pitch is less than the insert thread pitch.

* * * * *